United States Patent
Eriksson et al.

(10) Patent No.: US 9,154,968 B2
(45) Date of Patent: Oct. 6, 2015

(54) RADIO BASE STATION AND A METHOD THEREIN

(75) Inventors: Erik Eriksson, Linköping (SE); Pål Frenger, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 215 days.

(21) Appl. No.: 13/880,995

(22) PCT Filed: Nov. 3, 2010

(86) PCT No.: PCT/SE2010/051197
§ 371 (c)(1),
(2), (4) Date: Apr. 23, 2013

(87) PCT Pub. No.: WO2012/060748
PCT Pub. Date: May 10, 2012

(65) Prior Publication Data
US 2013/0210491 A1     Aug. 15, 2013

(51) Int. Cl.
*H04W 16/28*     (2009.01)
*H04B 7/04*      (2006.01)
*H04W 16/24*     (2009.01)
*H04B 17/27*     (2015.01)
*H04B 17/382*    (2015.01)
*H04W 64/00*     (2009.01)

(52) U.S. Cl.
CPC ............ *H04W 16/28* (2013.01); *H04B 7/0413* (2013.01); *H04B 17/27* (2013.01); *H04B 17/382* (2013.01); *H04W 16/24* (2013.01); *H04W 64/00* (2013.01)

(58) Field of Classification Search
CPC ............ H04B 7/0413; H04B 17/0072; H04B 17/0077; H04W 16/28; H04W 16/24
USPC ....................... 455/446, 561, 562.2
See application file for complete search history.

(56) References Cited

U.S. PATENT DOCUMENTS 5,889,494 A * 3/1999 Reudink et al. ............... 342/373
6,181,276 B1 * 1/2001 Schlekewey et al. ......... 342/372

(Continued)

FOREIGN PATENT DOCUMENTS

| EP | 2161851 A1 | 3/2010 |
| EP | 2194740 A1 | 6/2010 |
| WO | 2010105566 A1 | 9/2010 |

*Primary Examiner* — Kashif Siddiqui
(74) *Attorney, Agent, or Firm* — Murphy, Bilak & Homiller, PLLC (57) ABSTRACT

Embodiments herein relate to a method in a radio base station (12) for providing radio coverage to a user equipment (10). The radio base station (12) comprises at least two radio antenna ports; a first antenna port (AP11) associated with a first physical antenna and a second antenna port (AP12) associated with a second physical antenna. The first antenna port (AP11) is arranged to provide a radio coverage over a first area (14) and the second antenna port (AP12) is arranged to provide a radio coverage over a second area (17). The radio base station (12) broadcasts a signal with system information over the first area (14) enabling the radio base station (12) to connect to the user equipment (10). The radio base station (12) also determines that a user equipment (10) in the first area (14) is to receive or transmit data. The radio base station (12) then obtains information related to a position of the user equipment (10) in the first area (14). The radio base station (12) then sets a characteristic of the second physical antenna based on the obtained information. Thereby to the radio base station provides radio coverage to the user equipment (10) via the second port (AP12).

18 Claims, 8 Drawing Sheets

(56) References Cited

U.S. PATENT DOCUMENTS

| | | | |
|---|---|---|---|
| 6,236,866 B1* | 5/2001 | Meyer et al. | 455/562.1 |
| 2003/0060205 A1* | 3/2003 | Shapira | 455/446 |
| 2003/0073463 A1* | 4/2003 | Shapira | 455/562 |
| 2009/0005096 A1 | 1/2009 | Scheinert | |
| 2009/0239523 A1 | 9/2009 | Miyamoto | |
| 2009/0323530 A1 | 12/2009 | Trigui et al. | |

* cited by examiner

RADIO BASE STATION AND A METHOD THEREIN

TECHNICAL FIELD

Embodiments herein relate to a radio base station and a method therein. In particular, embodiments herein relate a radio base station and a method for providing radio coverage to a user equipment within a radio communications network.

BACKGROUND

In today's radio communications networks a number of different technologies are used, such as Long Term Evolution (LTE), LTE-Advanced, 3rd Generation Partnership Project (3GPP) Wideband Code Division Multiple Access (WCDMA) system, Global System for Mobile communications/Enhanced Data rate for GSM Evolution (GSM/EDGE), Worldwide Interoperability for Microwave Access (WiMax), or Ultra Mobile Broadband (UMB), just to mention a few. The radio communications networks of today are moving towards more advanced multi antenna solutions to improve capacity and coverage. Multi antenna solutions, such as Multiple Input Multiple Output (MIMO), are one of the corner-stones in for example the LTE standard. LTE Rel 8 support up to 4 different transmit antenna ports, supporting both beam forming and diversity schemes for better coverage and multi stream for better capacity. LTE is a Frequency Division Multiplexing technology wherein Orthogonal Frequency Division Multiplexing (OFDM) is used in a downlink (DL) transmission from a radio base station to a user equipment. Single Carrier-Frequency Domain Multiple Access (SC-FDMA) is used in an uplink (UL) from the user equipment to the radio base station.

The system information in LTE is transmitted from a radio base station over a cell with a transmission (TX)-diversity scheme using all available antenna ports to improve the robustness of the signaling. To determine the number of antenna ports active in the cell a user equipment (UE) must first do a blind decoding of the first system information block, the Master Information Block (MIB). I.e. the UE does a hypothesis test that the cell is configured with a number of antenna ports, 1, 2 or 4, and if the UE manages to decode the MIB it assumes that it guessed correctly. This is a cost efficient way to convey the number of antenna-ports used that enables full utilization of the ports, but it also makes dynamic changes of the number of antenna ports hard to do, since the LTE standard does not say anything on when, if ever, the UE can be expected to re-do the hypothesis test.

To support demodulation and channel estimation each antenna port carries reference symbols or a set of reference symbols. The reference symbols are used for demodulation reference at data transmissions, channel estimation that the UE feeds back to the radio base station, handover measurements and/or for cell search. Since the radio base station cannot know when the UE may do cell search and to some extent handover measurements the reference symbols are transmitted at all time over the cell.

According to current technologies, a packet data shared channel (PDSCH) is to be transmitted on a same set of antenna ports as a physical broadcast channel (PBCH), which is one of the set of antenna ports {0}, {0, 1} or {0, 1, 2, 3}, in resource blocks in which UE-specific reference symbols are not transmitted.

Since the PBCH must be readable by all UEs, being in active mode and idle mode, that are located in the cell area this clearly states that it is not allowed to do beam-forming, as PDSCH shall use the same antenna ports as PBCH, on the individual antenna elements in LTE Rel-9 unless UE specific reference symbols are transmitted. Beam-forming is a signal processing technique used for direct signal transmission or reception towards a position or area.

There are two drawbacks of using UE specific reference symbols; reduced transmission rank and loss of resource elements.

First, the UE specific reference symbols in Rel-8 of LTE are limited to one antenna port, that is antenna port {5} in Rel-8, while the cell specific reference symbols are defined for up to 4 antenna ports {0, 1, 2, 3}. In Rel-9 there are two additional antenna ports {7, 8} for which UE specific reference symbols are defined that support spatial multiplexing of up to rank 2. Spatial multiplexing is defined as to transmit independent and separately encoded data signals, so-called streams, from each of the multiple transmit antennas. Therefore, a space dimension is reused, or multiplexed, more than one time.

Thus, for Rel-8 and Rel-9 only transmission rank 1, and 2 respectively, are possible when using UE specific reference symbols while rank 4 is supported when using the cell specific reference symbols as demodulation reference for the PDSCH. The "transmission mode" of the UE determines which antenna port to use. For example, in single layer transmission mode 7 antenna port 5 is used for transmission and single or dual layer transmission mode 8 antenna port 7 and/or antenna port 8 may be used for transmission.

Second, the UE specific reference symbols consume resource elements that could otherwise be used by data symbols. Antenna port 5, used for a transmission with UE specific reference symbols using only a single layer or stream, consumes 12 resource elements and antenna ports 7 and 8 also consume 12 resource elements in total. In a cell where all 4 cell specific antenna ports {0, 1, 2, 3} are used there are already 24 resource elements used and with UE specific reference symbols another 12 references symbols for demodulation reference is used.

Thus, transmissions of higher rank must today use the same antenna ports as the PBCH which are transmitted all over the cell of the radio base station and requires a lot of radio resources. The other antenna ports use UE specific reference symbols which enable only up to rank 2 and consume radio resources as well. Thus, to obtain a good performance of communications within the radio communications network a lot of radio resources are required or else one cannot use higher transmission ranks.

SUMMARY

An object of embodiments herein is to obviate at least some of the above disadvantages and provide an improved radio base station for telecommunications.

The object is achieved according to an aspect of embodiments herein by providing a method for providing radio coverage to a user equipment in a radio base station. The radio base station comprises at least two radio antenna ports; a first antenna port associated with a first physical antenna and a second antenna port associated with a second physical antenna. The first antenna port is arranged to provide a radio coverage over a first area and the second antenna port is arranged to provide a radio coverage over a second area.

The radio base station broadcasts a signal with system information over the first area via the first antenna port enabling the radio base station to connect to the user equipment.

The radio base station determines that a user equipment in the first area has data to receive or transmit. The radio base station then obtains information related to a position of the user equipment in the first area. Furthermore, the radio base station sets a characteristic of the second physical antenna based on the obtained information. Thereby, the radio base station provides radio coverage to the user equipment via the second antenna port.

In order to perform the method a radio base station for providing radio coverage to the user equipment is provided. The radio base station comprises at least two radio antenna ports; a first antenna port associated with a first physical antenna and a second antenna port associated with a second physical antenna. The first antenna port is arranged to provide a radio coverage over a first area and the second antenna port is arranged to provide a radio coverage over a second area. The radio base station further comprises a broadcasting circuit configured to broadcast a signal with system information over the first area via the first antenna port. Thereby, the radio base station is enabled to connect to the user equipment. Additionally, the radio base station comprises a determining circuit configured to determine that the user equipment in the first area has data to receive or transmit. Furthermore, the radio base station comprises an obtaining circuit configured to obtain information related to the position of the user equipment in the first area. The radio base station also comprises a setting circuit configured to set a characteristic of the second physical antenna based on the obtained information. The radio base station thereby provides radio coverage to the user equipment via the second antenna port.

Thus, one antenna port always provides radio coverage over the full cell or cell area and at least one other antenna port is used to enable multi carrier communications of high performance to the user equipment in an efficient manner by directing radio coverage towards the user equipment.

BRIEF DESCRIPTION OF THE DRAWINGS

Embodiments will now be described in more detail in relation to the enclosed drawings, in which.

DETAILED DESCRIPTION

Figure 1:
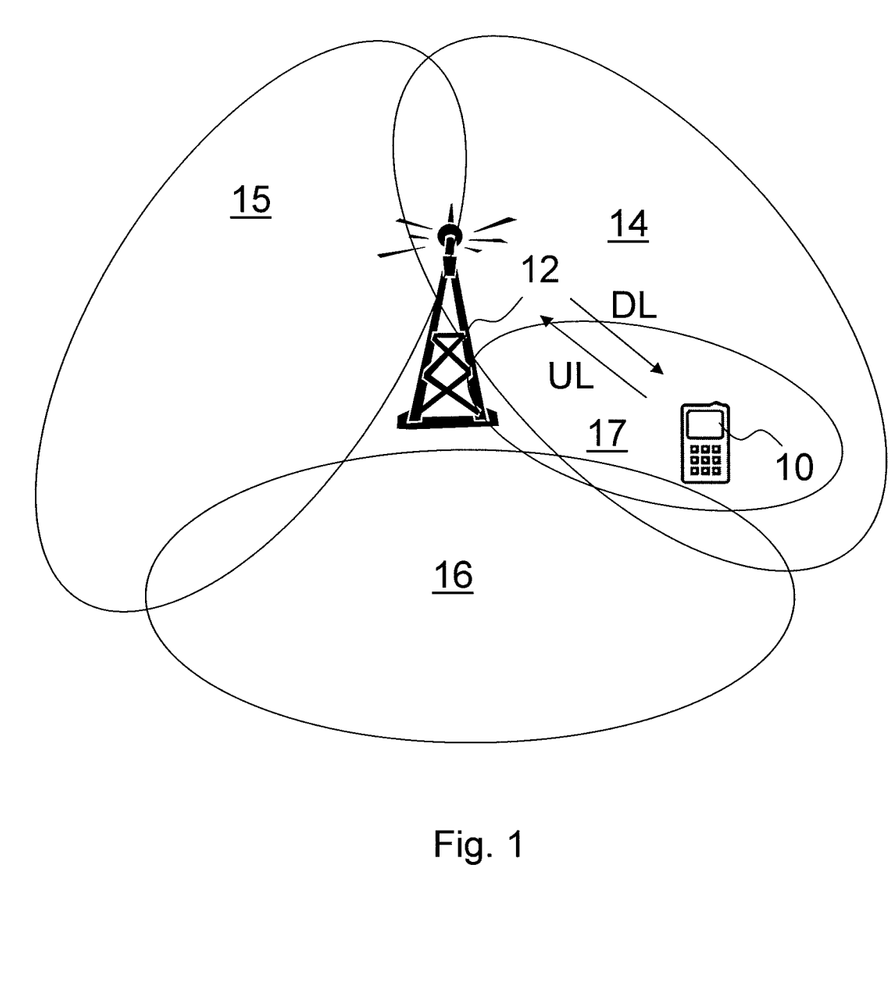
FIG. 1 is a schematic overview depicting a radio communications network.

FIG. 1 provides a general overview of embodiments herein. FIG. 1 shows a schematic overview of a radio communications network, such as e.g. the Long Term Evolution (LTE), LTE-Advanced, 3rd Generation Partnership Project (3GPP) Wideband Code Division Multiple Access (WCDMA) system, Global System for Mobile communications/Enhanced Data rate for GSM Evolution (GSM/EDGE), Worldwide Interoperability for Microwave Access (WiMax), or Ultra Mobile Broadband (UMB), just to mention some possible options for implementing embodiments disclosed herein.

The radio communications network comprises a user equipment (UE) 10 and a radio base station 12. The user equipment 10 is served by the radio base station 12 and is communicating over a radio link with the radio base station 12, which communication is a so called uplink (UL) transmission. The radio base station 12 is communicating with the user equipment 10 in a so called downlink (DL) transmission. The radio base station 12 is controlling a first sector cell in which the user equipment 10 is served. The first sector cell is defined as providing a radio coverage over a first area 14. However, the radio base station 12 use multiple antenna ports wherein at least one antenna port provides the radio coverage over the first area 14 by broadcasting system information. At least one other antenna port is used for capacity boost, which means that a radio coverage over a second area 17, i.e. a second cell, of the at least one other antenna port is changed dependent on which radio position the user equipment 10 has. Thereby the radio base station 12 enables a multiple antenna capacity communication between the radio base station 12 and the user equipment 10.

The illustrated radio base station 12, being a multiple sector radio base station, also controls a second sector cell providing radio coverage over a third area 15 and a third sector cell providing radio coverage over a fourth area 16. The third area 15 may also be referred to as a second sector area 15 and the fourth area 16 may also be referred to as a third sector area 16.

Consequently, embodiments herein relate to the radio base station 12 being configured to use multiple antenna ports where one or multiple of these ports have different coverage areas. One or multiple antenna ports are used for broadcast radio coverage while the rest antenna ports are used for capacity boost. The radio coverage of the capacity antenna ports are changed dependent on user equipment distribution within the cell or cells while the radio coverage of the broadcast coverage antenna is substantially fixed. Thus, one antenna port always provides radio coverage over the first sector cell or the first area 14 and other antenna ports are used to enable multi carrier communications of high performance to the user equipment 10 in an efficient manner by directing these towards the user equipment 10 when the user equipment has data to receive or transmit.

Embodiments herein enable quick and effective switching between power efficient low load operation and high bitrate operation by fast Multiple Input Multiple Output (MIMO) activation in limited service areas. I.e. a beam-shape of one or multiple antenna ports, being different from a beam shape of the first antenna port, provides radio coverage of one or more of those antenna ports over a second are 15, which second area 15 may be changed or adjusted instantly.

Figure 2:
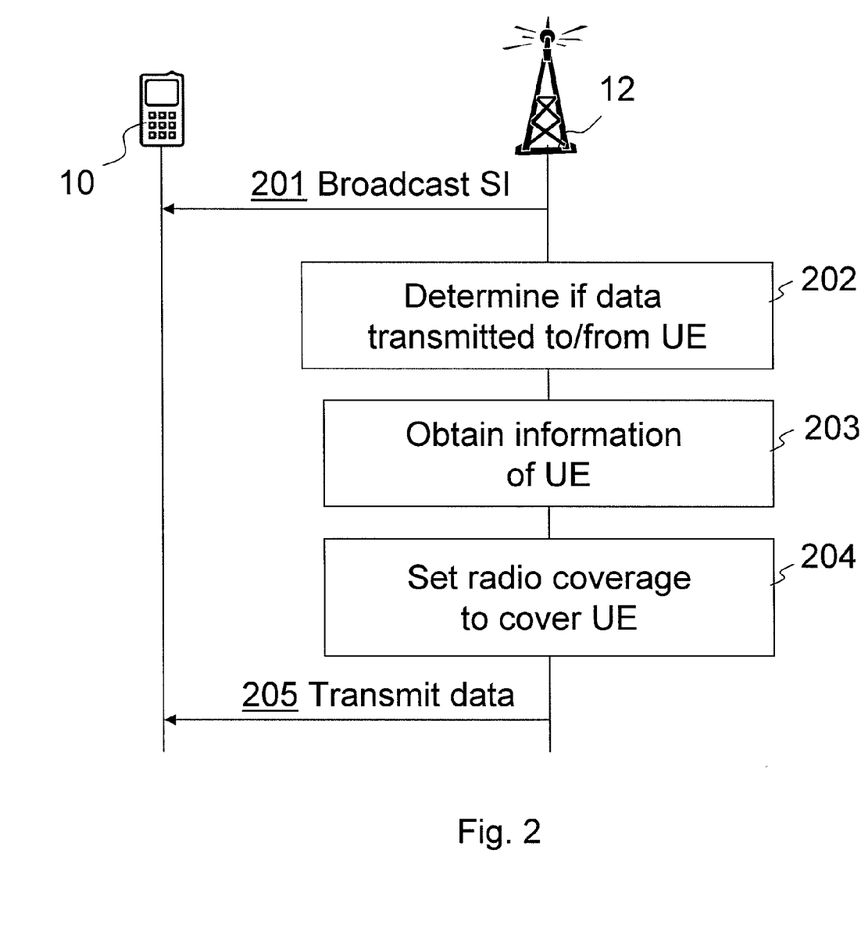
FIG. 2 is a schematic combined signalling and flow chart in a radio communications network.

FIG. 2 discloses a schematic combined signaling and flow chart in the radio communications network. The radio base station 12 supports at least one cell where said cell may be configured with more than one antenna port. A first antenna port has a wide antenna beam pattern set or adjusted for covering the first area 14 supported by said radio base station 12. And at least one other antenna port, a second antenna port, may have a narrow antenna beam pattern set or adjusted for support user equipments that are currently active, which means that the data is to be communicated to or from the user equipment 10. The antenna ports may be cell specific antenna ports which means that a cell specific reference symbol is mapped to each antenna port but no user equipment specific reference symbols are used. Narrow beam herein means that the beam is not as wide as the beam of the first antenna port.

Step 201. The radio base station 12 broadcasts a signal with system information over the first area 14 via the first antenna port enabling the radio base station 12 to reach or to connect to the user equipment 10. For example, the user equipment 10 is able to detect and measure on the first sector cell of reference symbols broadcasted on a PBCH.

Step 202. The radio base station 12 determines that the user equipment 10 has data to receive or transmit, also known as going active. For example, the radio base station 12 may comprise a buffer queue of data intended for the user equipment 12, an indication that the user equipment 10 wants to transmit data or the like. As the radio base station 12 broadcasts system information over the first area 14 in step 201, the radio base station 12 may page the user equipment 10 to notify that the user equipment 10 should change from idle mode to active mode. It should be understood that the user equipment may have both data to receive and transmit.

Step 203. When determined that the user equipment 10 has data to transmit or receive, the radio base station 12 obtains information related to a position of the user equipment 10 within the first area 14. For example, the user equipment 10 may report to the radio base station 12 its own position from a Global Positioning System (GPS) measurement or based on channel information of the broadcasted system information. Other methods such as uplink measurements at the radio base station 12 may also be used to calculate and thereby obtain information relating to the position of the user equipment 10.

Step 204. The radio base station 12 sets a characteristic of a physical antenna associated with the second antenna port based on the obtained information. Thereby the radio base station 12 may adjust the second area 17 to cover the position of the user equipment 10 to provide radio coverage to the user equipment 10 via the second antenna port. For example, individual antenna element associated with the second antenna port may then be beam-formed towards the currently active user equipments including the user equipment 10. Beam forming may be performed by electrical and mechanical tilting, width of lobe, width of azimuth of signal by adjusting phase and amplitude of the second physical antenna. It should be understood that each antenna port may be associated with a plurality of physical antennas.

Step 205. The radio base station 12 may then, in some embodiments, use the different antenna ports to transmit data to the user equipment 10 or alternatively receive data from the user equipment 10.

Thus, the radio base station 12 may perform a multicarrier communication, such as MIMO transmissions, to the user equipment 10 that is efficiently directed towards different user equipments within the radio coverage of the radio base station 12. Embodiments herein provide an improved diversity transmission and improved radio coverage.

Figure 3:
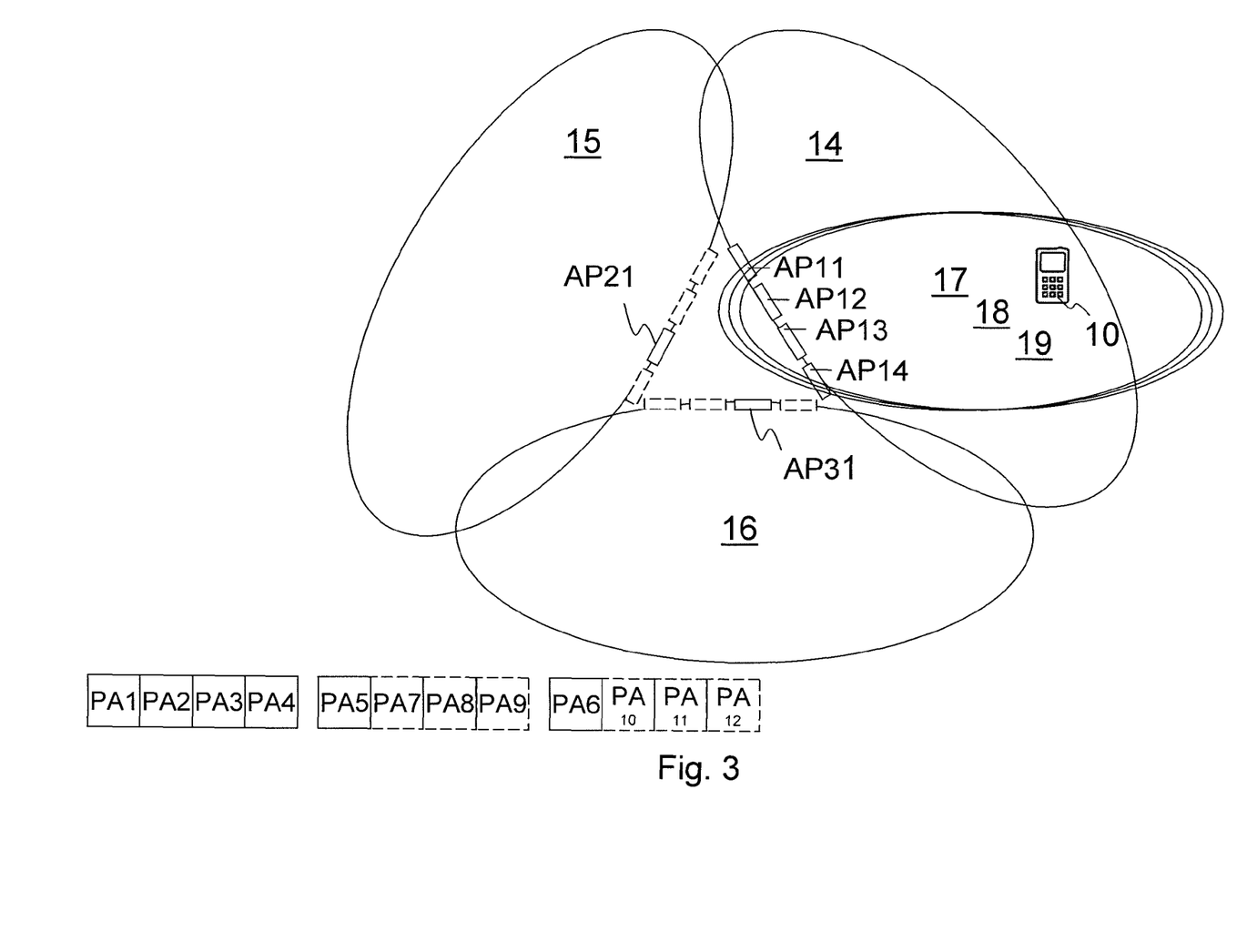
FIG. 3 is a schematic overview depicting radio coverage of a radio base station.

FIG. 3 is a schematic overview of the radio base station 12 in the radio communications network. The radio base station 12 controls the first sector cell providing radio coverage over the first area 14, also referred to as a first sector area 14. The antenna ports of the radio base station 12 is illustrated as a first antenna port AP11, a second antenna port AP12, a third antenna port AP13, and a fourth antenna port AP14. The first antenna port AP11 is power fed by a first power amplifier PA1, the second antenna port AP12 is power fed by a second power amplifier PA2, the third antenna port AP13 is power fed by a third power amplifier PA3, and the fourth antenna port AP14 is power fed by a fourth power amplifier PA4.

The radio base station 12 controls a second sector cell providing radio coverage of a second sector area 15 and a third sector cell providing radio coverage of a third sector area 16. The radio coverage over the second sector area 15 is handled by a fifth antenna port AP21 and radio coverage over third sector area 16 is handled by a sixth antenna port AP31. The fifth antenna port AP21 is power fed by a fifth power amplifier PA5 and the sixth antenna port AP31 is power fed by a sixth power amplifier PA6. The power amplifiers not used are marked with dashed lines, thus it may be seen that power amplifiers PA7-PA12 are not used.

Each antenna port AP11, AP12, AP13, AP14, AP21, AP31 is associated with one or more respective physical antennas, each comprising a number of adjustable antenna elements. Thus, the first antenna port AP11 is associated with a first physical antenna, the second antenna port AP12 is associated with a second physical antenna, the third antenna port AP13 is associated with a third physical antenna, the fourth antenna port AP14 is associated with a fourth physical antenna etc. An adjustable element may comprise phase, amplitude, tilt, width of lobe, direction just to mention a few.

As stated above, the radio base station 12 provides radio coverage over the first area 14 by transmitting a broadcast signal with system information via the first antenna port over the first area 14. This enables the radio base station 12 to connect to the user equipment 10. The radio base station 12 determines that data is to be received at or transmitted from the user equipment 10. The radio base station 12 obtains information related to a position of the user equipment 10 in the first area 14.

The radio base station 12 then sets one or more characteristics of the second physical antenna associated with the second antenna port AP12 based on the obtained information and thereby provides radio coverage to the user equipment 10 via the second antenna port AP12. This may be performed by setting or adjusting a lobe width of a signal, direction of the radio coverage, tilting of the second physical antenna, and/or set any antenna element of the second physical antenna.

In order to obtain even higher rank transmissions the radio base station 12 may set one or more characteristics of a third physical antenna associated with the third antenna port AP13 based on the obtained information and thereby setting a third area 18 to provide radio coverage to the user equipment 10 via the third port AP13. Furthermore, the radio base station 12 may also set one or more characteristics of a fourth physical antenna associated with the fourth antenna port AP14 based on the obtained information. Thereby a fourth area 19 is set to provide radio coverage to the user equipment 10 via the fourth port AP14. Thus, a possible transmission rank of three or even four may be achieved if the first antenna port AP11 is also used to transmit one data stream.

In some embodiments, cell specific reference symbols may be mapped to the different antenna ports. By using cell specific reference symbols mapped to the different antenna ports the potential gain of replacing the UE specific reference symbols with data symbols instead is 11%. For example, a resource block comprises 116 resource elements for data compared to 104 resource elements for data, in the "worst case" scenario. Worst case scenario means that 4 cell specific reference symbols and a control region of 3 symbols are used. In the "best case" scenario, that is, 1 cell specific reference symbols and 1 symbol control region, the potential gain is 8%, 150 resource elements for data compared to 138 resource elements for data. Thus, using cell specific reference symbols for PDSCH demodulation in a cell configuration provides a possible rate gain in the range of 8-11%.

The first cell covering the first area 14 is serving one user equipment 10 and have all antenna elements active but with the aid of re-configurable physical antennas all capacity boosting antenna ports, e.g. AP12,AP13,AP14 in this example, are adapted to provide optimized support for the currently active user equipment 10 while the first antenna port AP11 is not adapted towards the active user equipment 10. Inactive user equipments may still do cell search and listen to system broadcast from the coverage antenna ports having a stable coverage area. The radio base station 12 may turn of additional antenna ports of the defined areas all together since coverage is handled by the first antenna port.

A benefit of embodiments herein is to better support combined beam-forming and multi-stream transmission. With embodiments herein the transmission rank can theoretically be as high as 4, although it may be limited to 3 since only 3 antenna ports, e.g. {1, 2, 3}, may be beam-formed towards the active user equipment 10. With user equipment specific beam-forming the transmission rank is limited to 1 in LTE Rel-8 and 2 in LTE Rel-9. It should be noted that even though only 3 antenna ports may be "beamformed" towards the user equipment 10 the transmission rank will not be limited by the number of beamformed elements but rather the channel, that may or may not support up to rank 4. Since with reasonable power control all antenna ports may be received equally strong it is the channel that limits the transmission rank.

Furthermore, embodiments herein enable user specific beam-forming without paying the cost of reserving additional resource elements for data demodulation. I.e. the cell specific resource elements that are anyway mandatory e.g. for downlink control channels to work, may be used as demodulation reference and that provides an increase in the number of resource elements available for data symbols in the range of 8-11%. It is possible to use UE specific reference symbols, but in the above mentioned embodiments the cell specific reference symbols are used in a similar way as a UE specific reference symbols. By changing the coverage area of some of the antenna ports the reference symbols have been formed to a specific UE, or set of UEs. That way the extra overhead from the UE specific reference symbols is not needed, since the standard mandates that the user equipment 10 should assume that the cell specific reference symbols are transmitted. In some embodiments, UE-Specific reference symbols are not always an alternative solution. For example, in the case of tilting an antenna element it is not possible to tilt the antenna elements for data and UE-specific reference symbols but it is for the cell specific reference symbols going out from that antenna.

Figure 4:
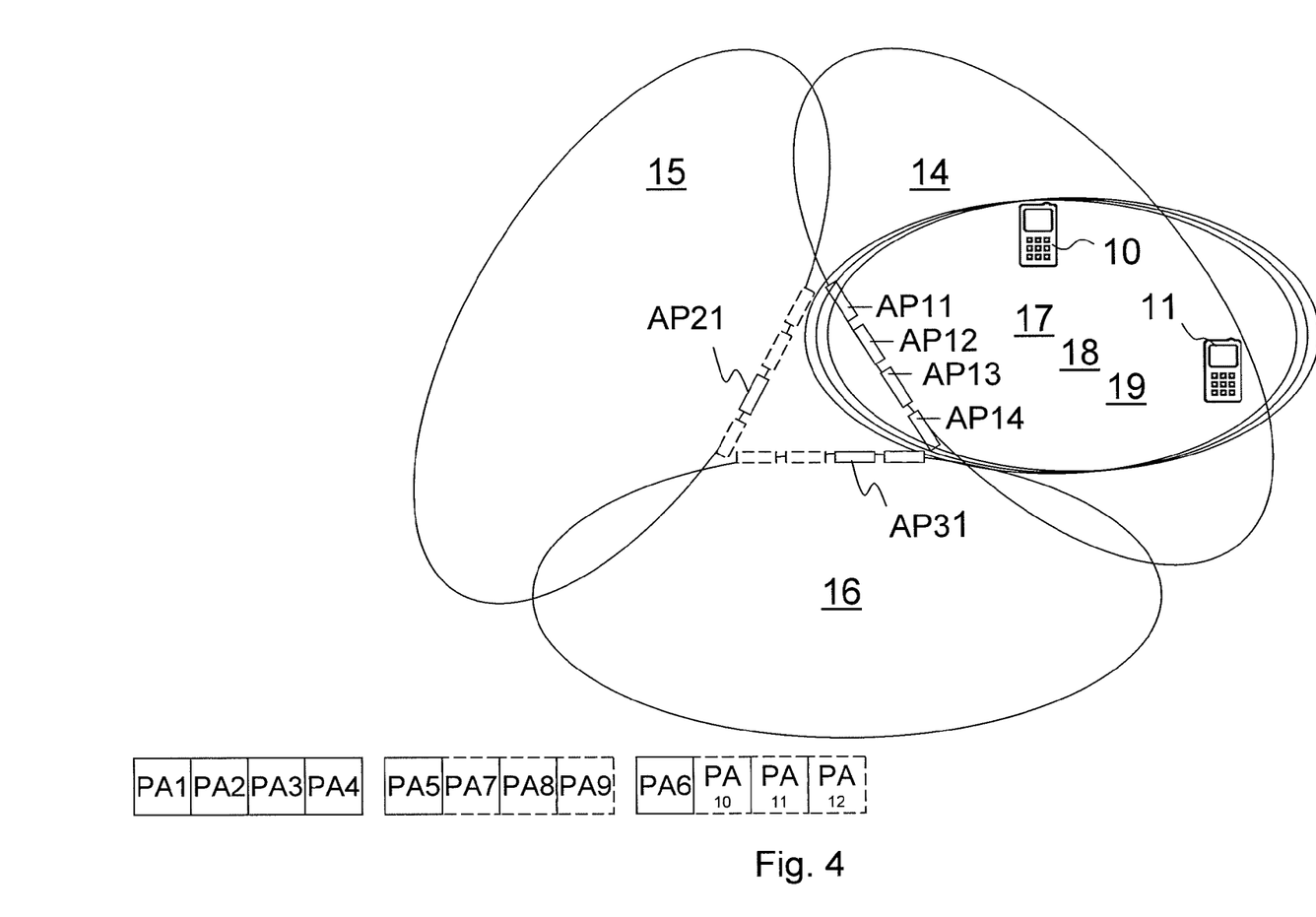
FIG. 4 is a schematic overview depicting radio coverage of a radio base station.

FIG. 4 discloses a schematic overview of the radio base station 12 in the radio communications network. The radio base station 12 in FIG. 4 corresponds to the radio base station 12 in FIG. 5 when the load in a cell changes. The radio base station 12 controls the first cell providing radio coverage over the first area 14. The antenna ports of the radio base station 12 is illustrated as the first antenna port AP11, the second antenna port AP12, the third antenna port AP13, and the fourth antenna port AP14. The first antenna port AP11 is power fed by the first power amplifier PA1, the second antenna port AP12 is power fed by the second power amplifier PA2, the third antenna port AP13 is power fed by the third power amplifier PA3, and the fourth antenna port AP14 is power fed by the fourth power amplifier PA4.

The radio base station 12 controls a second sector cell providing radio coverage of the second sector area 15 and a third sector cell providing radio coverage of the third sector area 16. The radio coverage over the second sector area 15 is handled by the fifth antenna port AP21 and radio coverage over the third sector area 16 is handled by the sixth antenna port AP31. The fifth antenna port AP21 is power fed by the fifth power amplifier PA5, the sixth antenna port AP31 is power fed by the sixth power amplifier PA6. The power amplifiers not used are marked with dashed lines, thus it may be seen that power amplifiers PA7-PA12 are not used.

Each antenna port is associated with one or more physical antennas comprising a number of adjustable antenna elements.

The load changes in the first sector cell when a second user equipment 11 is determined to have data to be transmitted to or received at the second user equipment 11 as well as the user equipment 10, referred to in FIG. 4 as the first user equipment 10. Thus, the radio base station 12 may set the one or more characteristics differently than in FIG. 3 to provide multi stream transmission to both the first user equipment 10 and the second user equipment 11. So, the second area 17, third area 18, and fourth area 19 are adjusted to cover both the first user equipment 10 and the second user equipment 11. Hence, capacity boosting antenna ports AP12,AP13,AP14 have been adapted radio coverage area to include all active user equipments 10,11.

Figure 5:
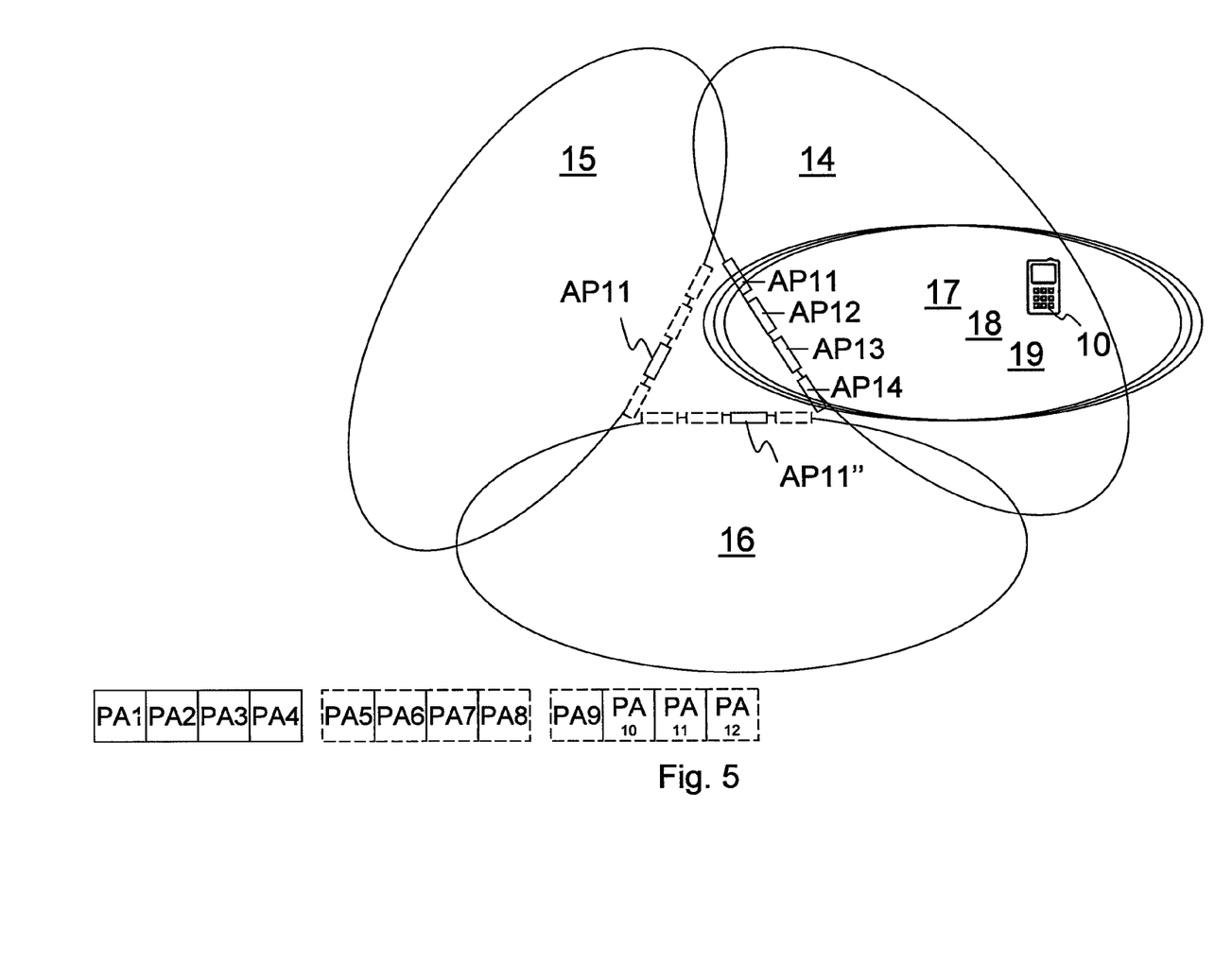
FIG. 5 is a schematic overview depicting radio coverage of a radio base station.

FIG. 5 discloses a schematic overview of the radio base station 12 in the radio communications network.

The radio base station 12 controls the first cell providing radio coverage over the first area 14, also referred to as first sector area 14. The antenna ports of the radio base station 12 is illustrated as the first antenna port AP11, the second antenna port AP12, the third antenna port AP13, and the fourth antenna port AP14. The first antenna port AP11 is power fed by the first power amplifier PA1, the second antenna port AP12 is power fed by the second power amplifier PA2, the third antenna port AP13 is power fed by the third power amplifier PA3, and the fourth antenna port AP14 is power fed by the fourth power amplifier PA4.

For the user equipment 10 to be able to detect and measure on a cell it is required that reference signals are transmitted even when there is no traffic in the cell. This result in a power cost since a power amplifier (PA) is needed to be turned on to transmit these reference signals. Improvements to power efficiency may be achieved by muting one or multiple antenna elements, but still power is needed even at low load. Each cell has its own set of reference signals with means that multiple PAs are needed to be active for a multi sector site causing power consumption and pilot pollution.

In order to save power all or some sectors in a site may be merged into one logical cell, that is the radio base station 12 controls the second sector cell providing radio coverage of the second sector area 15 and the third sector cell providing coverage of the third sector area 16. The radio coverage over the second sector area 15 is handled by a seventh antenna port AP11', which is actually the first antenna port AP11 but associated with a different physical antenna. The radio coverage over the third sector area 16 is handled by an eighth antenna port AP11", which is actually the first antenna port AP11 but associated with another different physical antenna. FIG. 5 shows a different embodiment where the logical antenna ports AP11, AP12, AP13, AP14 may be transmitted from different physical antennas. The seventh antenna port AP11' is power fed by the first power amplifier PA1, and the eighth antenna port AP11" is also power fed by the first power amplifier PA1. The power amplifiers not used are marked with dashed lines, thus it may be seen that power amplifiers PA5-PA12 are not used.

Hence, each antenna port AP11, AP12, AP13, AP14 may be associated with three physical antennas comprising a number of adjustable antenna elements. Thus, the radio base station 12 provides radio coverage over the first area 12 by transmitting a broadcast signal with system information via the first antenna port AP11 over the first area 14. This enables the radio base station 12 to connect to the user equipment 10. Also, over two different physical antennas associated to the first antenna port and fed by the same power amplifier PA1 radio coverage may be provided over the second sector area 16 and the third sector area 17. The radio base station 12 determines that data is to be received or transmitted from the user equipment 10. The radio base station obtains information related to the position of the user equipment 10 in the first area 14.

The radio base station 12 then sets one or more characteristics of the second physical antenna based on the obtained information and thereby provides radio coverage to the user equipment 10 via the second port AP12. This may be performed by setting or adjusting a lobe width of a signal, direction of the radio coverage, tilting of the second physical antenna, and/or setting any antenna element of the second physical antenna. The radio base station 12 may also set the radio coverage of the third and fourth antenna port to cover the position of the user equipment 10. Thus, the radio coverage area of one or more antenna ports may shift instantly to support high capacity in a limited area of the cell, without losing radio coverage.

Figure 6:
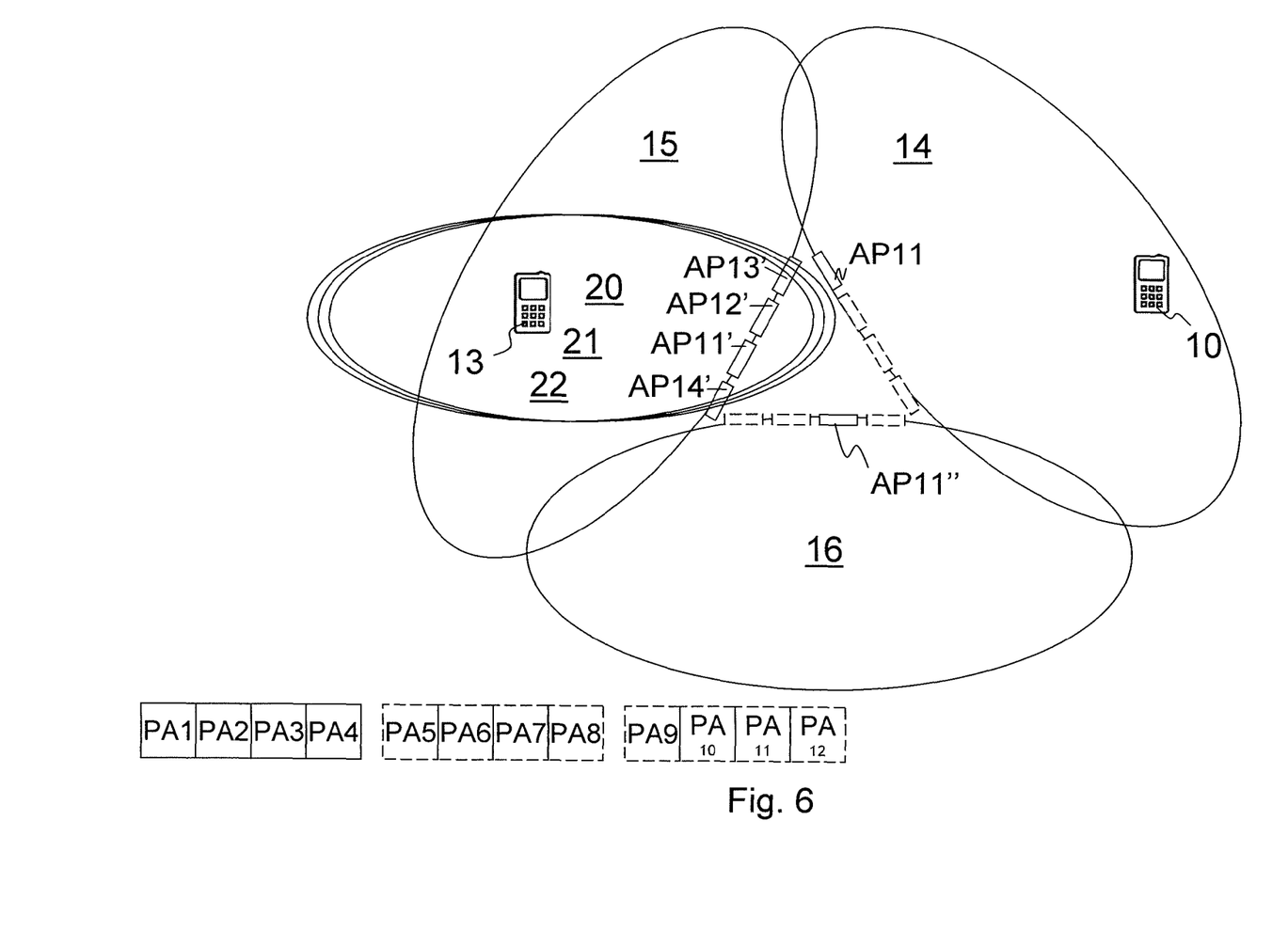
FIG. 6 is a schematic overview depicting radio coverage of a radio base station.

FIG. 6 discloses a schematic overview of the radio base station 12 in the radio communications network. The radio base station 12 in FIG. 6 corresponds to the radio base station 12 in FIG. 5 but in this example multiple user equipments, the first user equipment 10 and a third user equipment 13, are served in two different areas. The first antenna port AP11 associated with the first physical antenna provides radio coverage over the first sector area 14. The same antenna port but associated with a second physical antenna is denoted AP11' and provides radio coverage over the second sector area 15. Furthermore, the same antenna port but associated with a third physical antenna is denoted AP11" and provides radio coverage over the third sector area 16.

In this case of multiple active user equipments 10,13 the adjustable antenna elements may be adaptively mapped out on the different antenna ports. That is, the antenna ports AP12,AP13,AP14 may be time shared between cells. That is, at a first time slot the antenna elements associated with the physical antenna of each second, third and fourth antenna ports AP12, AP13, AP14 are adjusted to cover the first user equipment 10, as shown in FIG. 5. At a second time slot the antenna elements associated with a different physical antenna of each second, third and fourth antenna ports denoted as AP12',AP13',AP14' are adjusted to cover the third user equipment 13, as shown in FIG. 6. Thereby an adjustable radio coverage may be provided that alternates in times of milliseconds between different radio coverage areas. As a number of user equipments often do not receive data at the same millisecond the radio base station 12 may provide improved radio coverage and increased the transmission rank in beamformed multi-stream transmission scenarios. Furthermore, embodiments herein improve the data rates by allowing a re-use of already existing cell specific reference symbols, thereby reducing the overhead required for channel demodulation.

Figure 7:
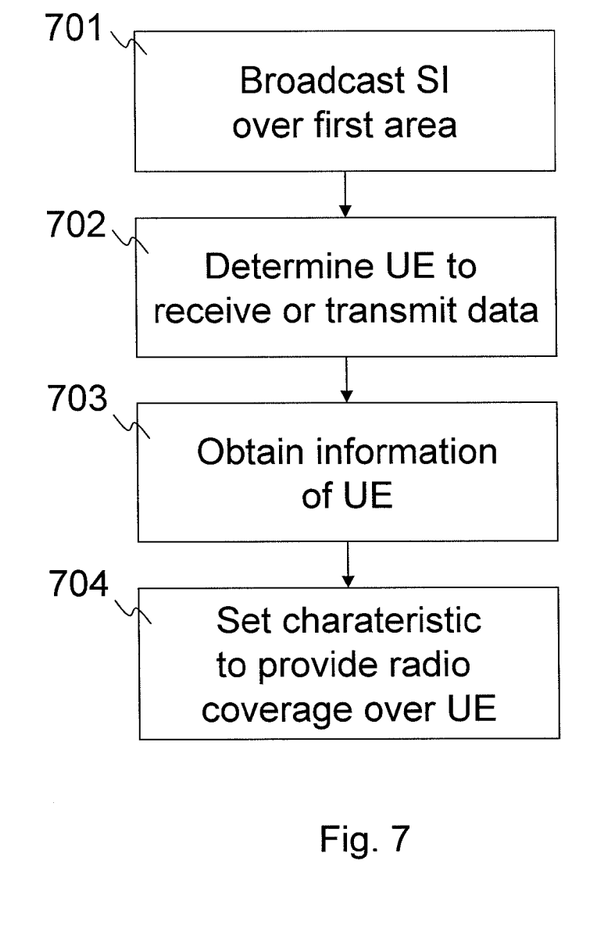
FIG. 7 is a schematic flow chart of a method in radio base station.

The method steps in the radio base station 12 for providing radio coverage to the user equipment 10 according to some embodiments will now be described with reference to a flowchart depicted in FIG. 7. The steps do not have to be taken in the order stated below, but may be taken in any suitable order. The radio base station 12 comprises at least two radio antenna ports; a first antenna port AP11 associated with a first physical antenna 804,805, and a second antenna port AP12 associated with a second physical antenna 808,807. The first antenna port AP11 is arranged to provide a radio coverage over a first area 14 and the second antenna port AP12 is arranged to provide a radio coverage over a second area 17.

Step 701. The radio base station 12 broadcasts a signal with system information over the first area 14 via the first antenna port AP11 enabling the radio base station 12 to connect to the user equipment 10.

Step 702. The radio base station 12 determines that the user equipment 10 in the first area 14 has data to receive or transmit. In some embodiments, this may be determined when the radio base station 12 comprises data in a buffer to be transmitted to the user equipment 10, indications that the user equipment 10 has data to transmit or data to receive or similar. It should be understood that the radio base station may determine that the user equipment 10 has data to both transmit and receive.

Step 703. The radio base station 12 obtains information related to a position of the user equipment 10 in the first area 14. In some embodiments, the user equipment 10 may, for example, report to the radio base station 12, on request or periodically, its own position from a GPS measurement or based on channel information of the broadcasted system information. Other methods such as uplink measurements at the radio base station 12 may also be used to obtain information related to the position of the user equipment 10. For example, the radio base station 12 may use these uplink measurements to calculate position information. The information may comprise position information or be information to be used to determine position. Thus, the radio base station 12 may obtain the information by receiving information or position information from the user equipment (10), performing measurement on an uplink signal and calculating a position of the user equipment 10, or retrieving the information from the radio base station 12.

Step 704. The radio base station 12 then sets a characteristic of the second physical antenna 807,808 based on the obtained information. The radio base station 12 thereby provides the radio coverage to the user equipment 10 via the second antenna port AP12. The characteristic may comprise lobe width of a signal, direction of the radio coverage, tilting of the second physical antenna, and/or any antenna element of the second physical antenna 807,808. Thus, the radio base station may provide two rank transmission and/or improve radio coverage of the radio base station 12. The second area 17 may by adjusted by setting these antenna elements differently thereby enabling the radio base station 12 to adjust the radio coverage of the second port AP12 towards one or more user equipments 10.

The radio base station 12 may in some embodiments comprise a set of antenna ports comprising a third antenna port AP13 associated with a third physical antenna and a fourth antenna port AP14 associated with a fourth physical antenna to provide transmissions up to transmission rank four. Then the radio base station 12 further sets a characteristic of the third physical antenna and/or the fourth physical antenna for providing multilayer radio coverage to the user equipment 10, e.g. enabling rank 2-4 transmissions.

In some embodiments, the radio base station 12 may comprise a multi sector radio base station, wherein a sector is a geographical area. A radio coverage of each sector of said multi radio base station is provided by separate antenna ports AP11,AP21,AP31 which respective antenna port AP11, AP21,AP31 is power fed with a separate power amplifier, respectively.

In some alternative embodiments, the radio coverage of each sector of said multi sector radio base station is provided by the first antenna port AP11,AP11',AP11". The first antenna port AP11,AP11',AP11" is power fed with a single power amplifier PA1 and associated with separate antenna elements for the different sectors. For example, the first antenna port AP11 is associated with a first physical antenna for the first sector and associated with different physical antennas for the second and third sectors. In some embodiments, the second antenna port AP12, AP12',AP12" is also associated with separate antenna elements for the different sectors. The second antenna port AP12, AP12', AP12" is then shared over time between the sectors. Thus, the radio base station 12 sets the characteristic of the second physical antenna 807,808 by setting characteristic of the separate antenna elements for the different sectors alternating in time between the different sectors. Thereby, the radio base station 12 provides radio coverage within the different sectors in an alternating manner enabling quick and effective switching between power efficient low load operation and high bitrate operation by fast Multiple Input Multiple Output (MIMO) activation in limited service areas in different sectors.

Embodiments herein provide a more power efficiently operation of lightly loaded networks without loss of peak bitrates compatible with for example the Rel 8 LTE standard. Embodiments herein also provide stable coverage even when employing active reconfigurable antennas systems. Lower system interference may be achieved since data transmissions may be done with focused energy direction.

Figure 8:
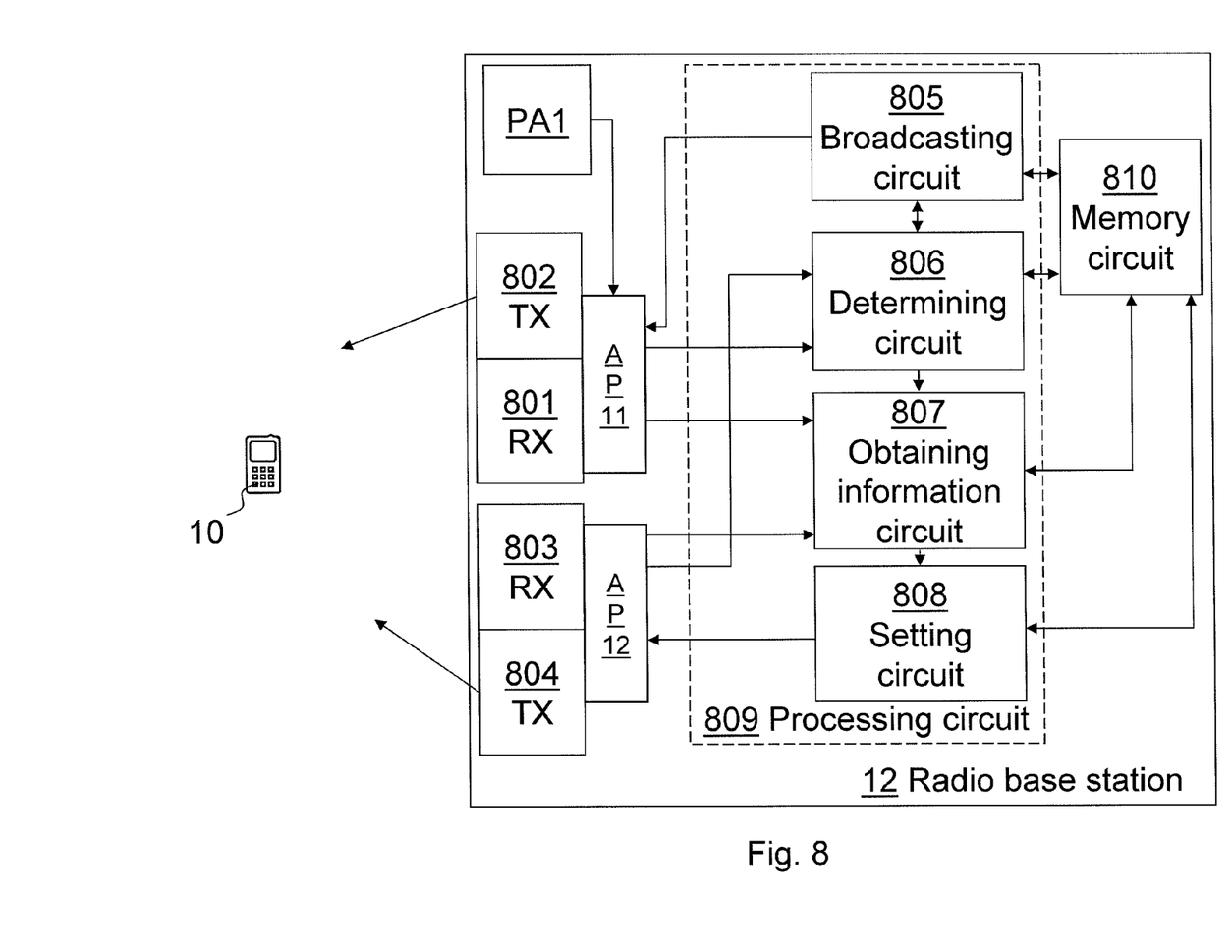
FIG. 8 is a block diagram depicting a radio base station.

In order to perform the method a radio base station is provided. In FIG. 8 a block diagram of the radio base station 12 is shown. The first cell in the radio communications network is being served by the radio base station 12, which in some networks is also called "eNB", "eNodeB", "NodeB" or "B node", which radio base station 12 may be of different classes e.g. macro eNodeB or home eNodeB or pico base station. A cell is a geographical area where radio coverage is provided by the radio base station 12. The radio base station 12 may communicate over an air interface operating on radio frequencies with the first user equipment 10 within range of the first cell. The radio base station 12 comprises a first antenna port AP11 associated with a first physical antenna 801,802 which first antenna port AP11 is arranged to provide a radio coverage over the first area 14 of the first cell. Furthermore, the radio base station 12 comprises a second antenna port AP12 associated with a second physical antenna 803,804, which second antenna port AP12 is arranged to provide a radio coverage over the second area 17. The first physical antenna 801,802 may comprise a receiver RX 801 and a transmitter TX 802. The second physical antenna 803, 804 may comprise a receiver RX 803 and a transmitter TX 804.

The radio base station 12 further comprises a broadcasting circuit 805 configured to broadcast a signal with system information over the first area 14 via the first antenna port AP11. Thereby, the radio base station 12 is enabled to connect to the user equipment 10. The broadcasting circuit 805 may be connected or comprised in a transmitter of the radio base station 12.

Furthermore, the radio base station 12 comprises a determining circuit 806 configured to determine that the user equipment 10 in the first area 14 has data to receive or transmit. The determining circuit 806 may, in some embodiments, further be configured to determine when the radio base station 12 comprises data in a buffer to be transmitted to the user equipment 10 or comprises indications that the user equipment 10 has data to transmit or data to receive.

The radio base station 12 further comprises an obtaining circuit 807 configured to obtain information related to a position of the user equipment 10 in the first area 14, when the determining circuit 806 has determined that the user equipment 10 is to receive or transmit data. The obtaining circuit 807 may in some embodiment be further configured to receive information from the user equipment 10, to perform measurement on an uplink signal and calculating a position of the user equipment, to retrieve the information from the radio base station 12 or the like.

The radio base station 12 also comprises a setting circuit 808 configured to set a characteristic of the second physical antenna 803,804 based on the obtained information. Thereby, the setting circuit 808 provides radio coverage to the user equipment 10 via the second antenna port AP12. In some embodiments herein, the setting circuit 808 is configured to set; lobe width of a signal, direction of the radio coverage, tilting of the second physical antenna, and/or set any antenna element of the second physical antenna 803,804.

In some embodiments, the radio base station 12 comprises a multi sector radio base station. That is, the radio base station 12 serves a plurality of sectors and comprises a number of separate antenna ports AP11,AP21,AP31. Each antenna port AP11,AP21,AP31 provides radio coverage of respective sector of said multi sector radio base station and each antenna port AP11,AP21,AP31 is configured to be power fed by a separate power amplifier PA1,PA5,PA6 comprised in the radio base station 12.

In some alternative embodiments, the first antenna port AP11 is configured to provide a radio coverage of each sector of said multi sector radio base station 12 and further configured to be power fed with a single power amplifier PA1 comprised in the radio base station 12. The first antenna port AP11 is configured to be associated with separate antenna elements for the different sectors. The second antenna port AP12 may then be configured to be associated with separate antenna elements for the different sectors. The second antenna port AP12 is then also configured to be shared over time between the sectors so that the setting circuit 808 is configured to set or adjust the characteristic of the separate antenna elements for the different sectors alternating in time between the different sectors. Thereby, radio coverage within the different sectors in an alternating manner is provided.

The radio base station 12 may be configured to map a cell specific reference symbol to a respective antenna port for transmission. Thus, the reference symbols in the different areas are not using user specific reference symbols leading to a more efficient data communication.

In some embodiments, the radio base station 12 further comprises a set of antenna ports comprising a third antenna port AP13 associated with a third physical antenna and a fourth antenna port AP14 associated with a fourth physical antenna to provide transmissions up to transmission rank four. Then the setting circuit 808 is further configured to set a characteristic of the third physical antenna and/or the fourth physical antenna providing multilayer radio coverage to the user equipment 10.

The embodiments herein for providing radio coverage to the user equipment 10 may be implemented through one or more processors, such as a processing circuit 809 in the base station 12 depicted in FIG. 8, together with computer program code for performing the functions and/or method steps of the embodiments herein. The program code mentioned above may also be provided as a computer program product, for instance in the form of a data carrier carrying computer program code for performing the present solution when being loaded into the radio base station 12. One such carrier may be in the form of a CD ROM disc. It is however feasible with other data carriers such as a memory stick. The computer program code may furthermore be provided as pure program code on a server and downloaded to the radio base station 12.

Furthermore, the radio base station 12 may comprise a memory circuit 810. The memory circuit may be used to store data on, such as buffer status, reference symbols, system information, position data, characteristics data, and applications to perform the methods disclosed herein when executed on the radio base station 12.

The user equipment 10 may e.g. be represented by a wireless communication terminal, a mobile cellular phone, a Personal Digital Assistant (PDA), a wireless platform, a laptop, a computer or any other kind of device capable to communicate wirelessly with the radio base station 12.

In the drawings and specification, there have been disclosed exemplary embodiments herein. However, many variations and modifications can be made to these embodiments without substantially departing from the principles of the embodiments. Accordingly, although specific terms are employed, they are used in a generic and descriptive sense only and not for purposes of limitation, the scope of the invention being defined by the following claims.

The invention claimed is:

1. A method in a radio base station for providing radio coverage to user equipments, which radio base station comprises at least two radio antenna ports, including a first antenna port associated with a first physical antenna, which first antenna port is arranged to provide a radio coverage over a first area, and a second antenna port associated with a second physical antenna and which second antenna port is arranged to provide a radio coverage over a second area, the method comprising:
broadcasting a signal with system information over the first area via the first antenna port thereby enabling the radio base station to connect to user equipments;
determining that a first user equipment in the first area has data to receive or transmit;
obtaining information related to a position of the first user equipment in the first area; and,
responsive to said determining and obtaining, setting a characteristic of the second physical antenna based on the obtained information, thereby providing radio coverage to the first user equipment via the second antenna port.

2. The method of claim 1, wherein the setting of the characteristic comprises setting at least one of:
a lobe width of a signal;
a direction of the radio coverage;
a tilting of the second physical antenna; and
a setting of any antenna element of the second physical antenna.

3. The method of claim 1, wherein the radio base station comprises a multi-sector radio base station, wherein a radio coverage of each sector of said multi-sector radio base station is provided by separate antenna ports, wherein each of which respective antenna port is power fed with a respective separate power amplifier.

4. The method of claim 1, wherein the radio base station comprises a multi-sector radio base station, wherein a radio coverage of each sector of said multi-sector radio base station is provided by the first antenna port, which is power fed with a single power amplifier, which first antenna port is associated with separate antenna elements for the different sectors.

5. The method of claim 4, wherein the second antenna port is associated with separate antenna elements for the different sectors and the second antenna port is shared over time between the sectors so that the setting of the characteristic of the second physical antenna comprises setting characteristic of separate antenna elements for the different sectors alternating in time between the different sectors, providing radio coverage within the different sectors of said multi-sector in an alternating manner.

6. The method of claim 1, wherein a cell-specific reference symbol is mapped to a respective antenna port for transmission.

7. The method of claim 1, wherein the radio base station further comprises a third antenna port associated with a third physical antenna and a fourth antenna port associated with a fourth physical antenna to provide transmissions up to transmission rank four, wherein the setting of a characteristic further comprises setting a characteristic of the third physical antenna or the fourth physical antenna, or both, for providing multilayer radio coverage to the first user equipment.

8. The method of claim 1, wherein the determining comprises determining that the radio base station comprises data in a buffer to be transmitted to the first user equipment or determining that the radio base station comprises an indication that the first user equipment wants to transmit data.

9. The method of claim 1, wherein the obtaining comprises one or more of receiving information from the first user equipment, performing measurement on an uplink signal and calculating a position of the first user equipment, or retrieving the information related to the position of the first user equipment from the radio base station.

10. A radio base station for providing radio coverage to user equipments, the radio base station comprising:
at least two radio antenna ports, including a first antenna port associated with a first physical antenna, which first antenna port is arranged to provide a radio coverage over a first area, and a second antenna port associated with a second physical antenna and which second antenna port is arranged to provide a radio coverage over a second area;
a broadcasting circuit configured to broadcast a signal with system information over the first area via the first antenna port enabling the radio base station to connect to the user equipments;
a determining circuit configured to determine that a first user equipment in the first area has data to receive or transmit;
an obtaining circuit configured to obtain information related to a position of the first user equipment in the first area; and
a setting circuit configured to set a characteristic of the second physical antenna, in response to said determining and obtaining, based on the obtained information, to provide the radio coverage to the first user equipment via the second antenna port.

11. The radio base station of claim 10, wherein the setting circuit is configured to set at least one of:
a lobe width of a signal;
a direction of the radio coverage;
a tilting of the second physical antenna; and
a setting of any antenna element of the second physical antenna; lobe width of a signal, direction of the radio coverage, tilting of the second physical antenna, and/or set any antenna element of the second physical antenna.

12. The radio base station of claim 10, wherein the radio base station comprises a multi-sector radio base station, comprising a number of separate antenna providing radio coverage of each sector of the multi-sector radio base station and wherein each antenna port is configured to be power fed by a separate power amplifier comprised in the radio base station.

13. The radio base station of claim 10, wherein the radio base station comprises a multi-sector radio base station, and wherein the first antenna port is configured to provide a radio coverage of each sector of said multi-sector radio base station and further configured to be power fed with a single power amplifier comprised in the radio base station, which first antenna port is configured to be associated with separate antenna elements for the different sectors.

14. The radio base station of claim 13, wherein the second antenna port is configured to be associated with separate antenna elements for the different sectors and the second antenna port is configured to be shared over time between the sectors so that the setting circuit is configured to set the characteristic of the separate antenna elements for the different sectors alternating in time between the different sectors, thereby providing radio coverage within the different sectors in an alternating manner.

15. The radio base station of claim 10, wherein radio base station is configured to map a cell-specific reference symbol to a respective antenna port for transmission.

16. The radio base station of claim 10, wherein the radio base station further comprises a third antenna port associated with a third physical antenna and a fourth antenna port associated with a fourth physical antenna, to provide transmissions up to transmission rank four, wherein the setting circuit is further configured to set a characteristic of the third physical antenna or the fourth physical antenna, or both, thereby providing multilayer radio coverage to the first user equipment.

17. The radio base station of claim 10, wherein the determining circuit is further configured to determine when that the radio base station comprises data in a buffer to be transmitted to the first user equipment or that the radio base station comprises an indication that the first user equipment wants to transmit data.

18. The radio base station of claim 10, wherein the obtaining circuit is further configured to receive the information related to the position of the first user equipment from the first user equipment, to perform measurement on an uplink signal and calculating a position of the first user equipment, or to retrieve the information related to the position of the first user equipment from the radio base station.

* * * * *